Jenkins & Knight,
Turning Irregular Forms.

Nº 9,521.   Patented Jan. 4, 1853.

UNITED STATES PATENT OFFICE.

B. F. JENKINS AND L. L. KNIGHT, OF BARRE, MASSACHUSETTS.

LATHE FOR TURNING IRREGULAR FORMS.

Specification of Letters Patent No. 9,521, dated January 4, 1853.

*To all whom it may concern:*

Be it known that we, BENJAMIN F. JENKINS and LUKE L. KNIGHT, of Barre, in the county of Worcester and State of Massachusetts, have invented certain new and useful Improvements in Machinery for Turning Irregular Forms; and we do hereby declare that the following is a full, clear, and exact description of the same, reference being had to the accompanying drawings, forming part of this specification, in which—

Figure 1:
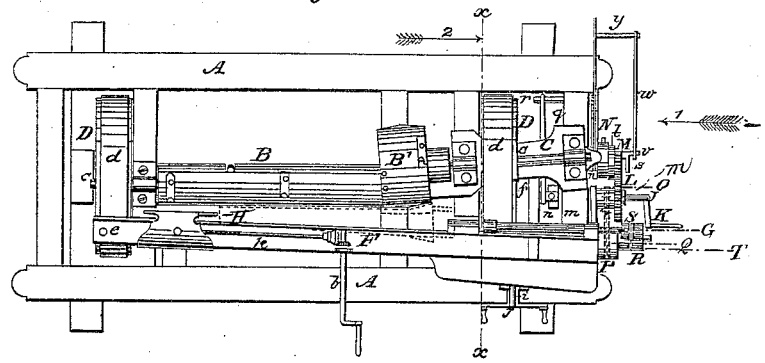
Figure 2:
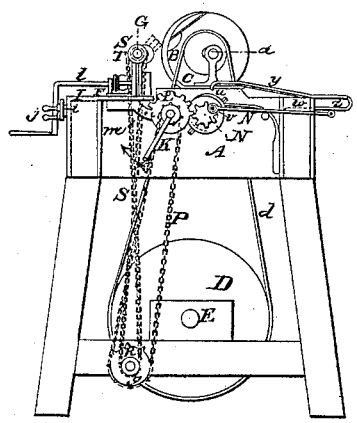
Figure 3:
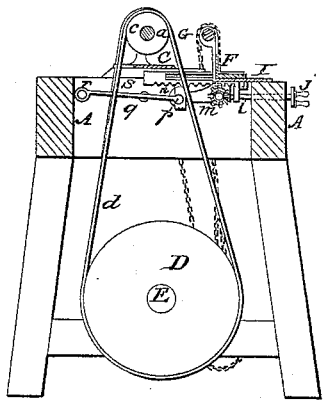

Figure 1 is a plan or top view of a turning lathe with our improvements. Fig. 2 is an end view of the same looking in the direction of the red arrow 1. Fig. 3, is a transverse vertical section of the same in the line $x$, $x$, of Fig. 1, looking in the direction of the red arrow 2.

Similar letters of reference indicate corresponding parts in each of the several figures.

This invention relates to that description of lathe in which the work and cutters both revolve and the irregularity of form is produced by the vibration of the axis of the work and of the whole or part of the cutters.

The improvements consist in certain simple and effective means of controlling the vibrations of the said axes.

To enable those skilled in the art to make and use our invention we will proceed to describe its construction and operation.

A, is the frame which supports all the working parts of the lathe.

B, B′, are two cutter cylinders, one B, of which has its axis hung in fixed bearings, but the other B′, has its shaft $a$, hung in bearings in a head C, which vibrates from a center $b$, on the frame. The shaft of each cutter cylinder is provided with a pulley $c$, which receives motion through a band $d$, from a pulley D, on a shaft E.

F, is the work carriage, having suitable heads to carry the revolving mandrel G, and the movable puppet center H. This carriage rests on a bed plate I, being attached to the said plate by a pivot $e$, at one end, the opposite end being adjustable on the bed plate by means of a rack $f$, attached to the carriage and a pinion $g$, (see Fig. 3) on a horizontal shaft $h$, under the bed plate, the said shaft $h$, gearing by bevel gear with a short shaft $i$, whose end projects through the front of the frame and is furnished with a handle $j$, by which it is turned. The bed plate I, is pivoted, near the pivoted end of the carriage, to the frame, but this pivot is not seen in the views represented. The head of the movable puppet center H, is adjusted by a screw $k$, which is geared by bevel gearing to a spindle $l$, which is furnished with a crank handle, in a position convenient to the operator.

As there is nothing essentially new in any of those portions of the lathe above referred to, we have only described them sufficiently to render the remaining portions which constitute our improvements, to be understood.

The lathe represented is especially adapted for turning spokes and the movements of the cutters and work are suitable therefor, but the description will enable any mechanic to understand that articles of different forms may be turned. The work carriage receives its vibrating motion through a shaft J, which is fitted to turn in bearings in arms $m$, attached below the bed plate I, the said shaft carrying a disk $n$, in whose face there is an adjustable stud $p$, which by being set at different distances from the axis will form a crank of varying throws. This stud, $p$, is connected by a rod $q$ to a stud $v$, which is fixed in the frame. By turning the shaft J, with the crank handle K provided for the purpose, the shaft J, moves toward and from the stud $v$, and with it the bed I, and carriage F. The bed I, is kept in a horizontal position and consequently the work carriage vibrates horizontally, or toward and from the cutter cylinders whose axes are in the same horizontal plane as that of the mandrel G, and puppet center H. Upon the shaft J, there is a toothed wheel L, whose teeth extend only half around, and upon a fixed axis $s$, there is a toothed wheel M, of half the diameter of L, or having the same number of teeth in its whole periphery that L has on half. The wheel L, communicates motion to M, giving it the same number of revolutions as it itself makes, but giving it one revolution while the teeth are in gear and then causing it to remain stationary while that part of the periphery on which there are no teeth is passing. The wheel M, is eccentric to its axis in order to make it continue in gear with L, while the shaft J, is moving horizontally, it is attached to an adjustable disk $t$, which is attached to a disk $u$, which is concentric to the axis, and its eccentricity must always be made to correspond with that of the stud $p$. On the outside of the hub of the wheel M, there is an eccentric pin $v$, which is the equivalent of a crank, and to this pin a connecting rod $w$, connects a rod $y$, which is attached to the end of the head C, the said rod $y$, having a guide pin $z$, which works in a guide in the frame and keeps it in place. At the back of the disk $u$, a spring catch N, catches in a notch in the hub, and holds the disk so that it will not revolve after the teeth or the wheel L, pass the wheel M, but the notch is so formed that it will throw the catch out when power is applied to the wheel M, to turn it. The stuff from which the spoke is to be cut represented in red color between the centers is caused to revolve by turning the shaft J, on which there is a sprocket wheel O, which communicates motion through a chain P, to another sprocket wheel Q, twice the diameter of O, on a stud near the lower part of the frame. There is another sprocket wheel R, attached to Q, which communicates motion through a chain S, to a sprocket wheel T, of the same size on the end of the mandrel G.

The shaft E, receives rotary motion from any prime mover at such speed as will impart a high velocity to the cutter cylinders. The piece of stuff for the spoke is placed between the centers and secured, the work carriage F, is then brought to its proper position upon the bed plate I, to bring the stuff up to the cutters. The operator then commences to turn the handle K, slowly in the direction of the black arrow (see Fig. 2), giving the shaft J, two entire revolutions, which owing to the relative sizes of the sprocket wheels give the work only one revolution. The eccentric stud $p$, causes the work carriage during the said two revolutions, to vibrate twice toward and from the cutter cylinders, and the gearing L, M and rods $w$ and $y$, cause the vibrating cutter cylinder B', to vibrate twice back and forth toward the work, but to rest for a short interval each time it is in its farthest position from the axis of the work. The stud $p$, and the stud $v$, are so arranged in relation to each other as to make the vibrating cutting cylinder and work carriage advance toward each other, so that both arrive at their nearest position to each other simultaneously; but as the cylinder makes its movement in half the time that the work carriage takes to make its movement, it does not commence to move until after, and finishes moving before the carriage. During the time that the axis of the cylinder B', is stationary between its vibrations, one of the narrow sides of the spoke near the tenon is being cut by it, the work carriage during that time making the last half of one vibration backward; and the first half of the next vibration forward; and during the time that the axis of B', is moving toward and from the carriage one of the broad sides of the spoke is cut, the carriage in the meantime making the latter half of the forward vibration and the first half of the next vibration backward. As the carriage and vibrating cylinder move toward and from each other twice during every revolution of the spokes, it will be understood that that part of the spoke with which the cylinder comes in contact will have the form in transverse section of a four sided figure. The remaining portion of the spoke which is cut by the cylinder B, with the stationary axis will be of elliptical form varying in its departure from the circular form with the distance from the pivot from which it vibrates.

By changing the proportions between the wheels L, and M, and between O and Q, and altering the relative positions of the studs $p$, and $v$, the vibrations of the carriage and cylinder, and the revolution of the work may be so controlled as to produce sections of any desired form varying throughout the length of the work.

We do not claim the vibrating cutter cylinder and vibrating work carriage, but—

What we claim, and desire to secure by Letters Patent, is—

Giving the necessary relative vibrations to the cutter cylinder B', and work carriage H, by crank pins or eccentrics $v$, and $p$, upon the axes of a pair of toothed wheels M, and, L, of which one is toothed all around its periphery and the other upon any suitable portion of its periphery, the latter wheel having a constant rotary motion applied which gives an intermittent rotary motion to the former wheel, whereby the said cutter cylinder and work carriage receive the one a constant vibratory motion and the other an intermittent vibratory motion, substantially as described.

BENJN. F. JENKINS.
LUKE L. KNIGHT.

Witnesses:
N. F. BRYANT,
J. P. STRONG,